United States Patent [19]
Proffit

[11] 3,841,663
[45] Oct. 15, 1974

[54] RETRACTABLE TRAILER TONGUE STAND

[76] Inventor: John D. Proffit, 1808 Dawson Rd., Clarksville, Tenn. 42240

[22] Filed: Jan. 10, 1973

[21] Appl. No.: 322,550

[52] U.S. Cl.......... 280/475, 248/240.4, 280/43.22, 280/150.5, 280/475
[51] Int. Cl................................................ B60d 1/14
[58] Field of Search......... 280/150.5, 414 A, 150 A, 280/43.17, 475, 43.22; 248/240.4, 240

[56] References Cited
UNITED STATES PATENTS

| | | | |
|---|---|---|---|
| 255,781 | 4/1882 | Graeser | 280/150.5 X |
| 2,104,734 | 1/1938 | Carpenter | 280/475 X |
| 2,580,545 | 1/1952 | Hill | 280/475 X |
| 3,529,850 | 9/1970 | Montalto | 280/150.5 |

FOREIGN PATENTS OR APPLICATIONS

| | | | |
|---|---|---|---|
| 63,746 | 10/1913 | Austria | 248/240 |

Primary Examiner—David Schonberg
Assistant Examiner—Michael J. Forman
Attorney, Agent, or Firm—Clarence A. O'Brien; Harvey B. Jacobson

[57] ABSTRACT

A retractable trailer tongue stand comprising a support structure adapted to maintain a trailer tongue above the ground, said support structure being mounted to the trailer tongue by way of a slot and pivot connection, whereby it may be manually locked in either a vertical position or a horizontal position without the use of special tools, or the like.

7 Claims, 6 Drawing Figures

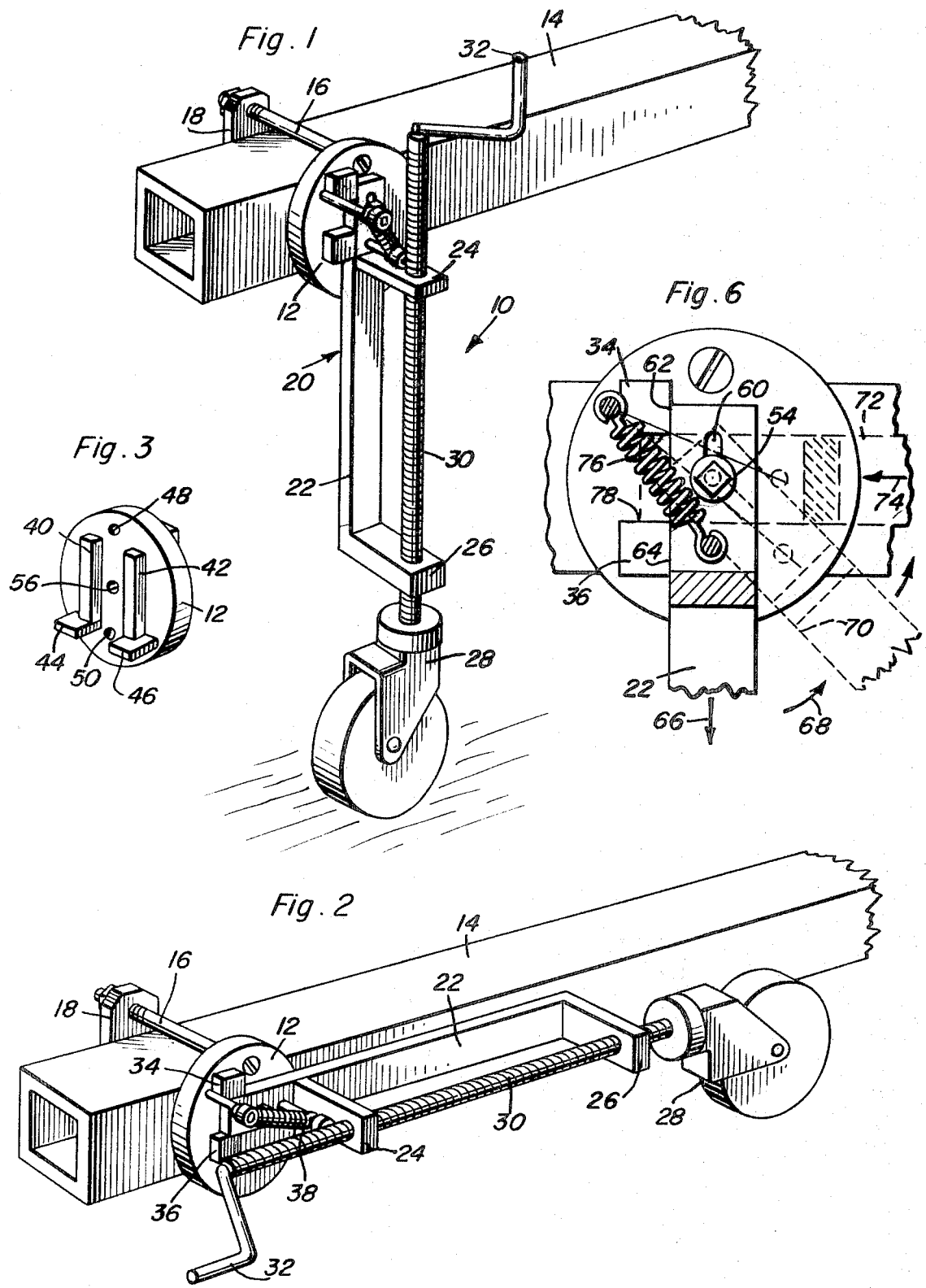

RETRACTABLE TRAILER TONGUE STAND

The present invention is generally related to trailers and, more particularly, to a retractable stand for trailer tongues, or the like.

In the past, various structures or stands have been provided for supporting trailer tongues above the ground when disconnected from their towing vehicles. Many conventional constructions have been provided with means for swinging, or otherwise retracting, the support when not in use. This prevented possible damage to the structure, the trailer tongue, or both when the trailer was being towed. While such conventional constructions have proven satisfactory for preventing damage to the support stand, they have been, for the most part, inconvenient to operate, including nuts, bolts, or other fastening hardware. Such conventional fastening arrangements often required the use of tools and were susceptible to deterioration over a period of time, whereby the support could not be readily moved to the alternate position.

Therefore, it is an object of the present invention to provide an improved retractable stand which may be mounted to a trailer tongue to hold such off the ground when not in use and which may be quickly and conveniently retracted when the trailer is connected to a towing vehicle, such that the stand will not interfere with operation or movement of the trailer when being towed.

Another object of the present invention is to provide a novel retractable trailer tongue stand which is of relatively simple construction and which may be conveniently and expeditiously operated to selectively position a support structure in either vertical position or a horizontal position.

It is a further object of the present invention to provide a unique retractable trailer tongue stand which may be easily operated by hand without the use of special tools or the like to effect swinging of a support structure from a generally vertical position to a generally horizontal position along the side of a trailer tongue.

Still another object of the present invention is to provide a versatile retractable trailer tongue stand which includes a minimum number of moving parts, is easy to operate, is durable, long lasting, and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a perspective view of the stand of the present invention mounted to a typical trailer tongue and with the support oriented in a vertical position.

FIG. 2 is a perspective view of the stand illustrated in FIG. 1, but with the support oriented in a retracted, or horizontal position.

FIG. 3 is a perspective view of the mounting plate associated with the present invention.

FIG. 6 is a sectional view taken along section 6—6 of FIG. 5, with phantom views of the support in intermediate and horizontal positions.

Figure 4:
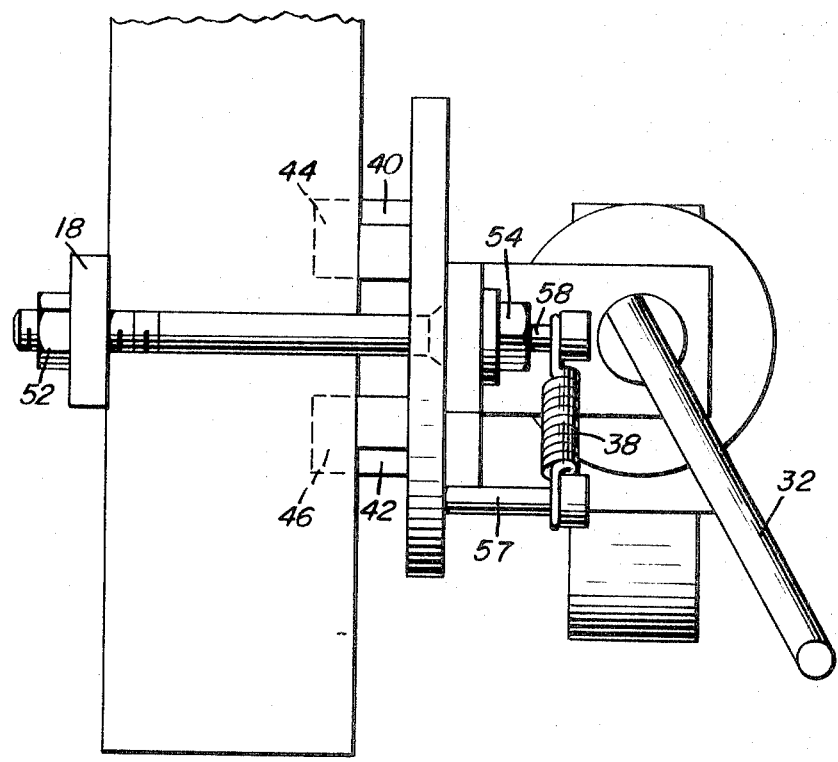
FIG. 4 is an enlarged top plan view of the trailer tongue stand illustrated in FIG. 1.

Referring now, more particularly, to FIGS. 1 and 2 of the drawings, the trailer tongue stand of the present invention is generally indicated by the numeral 10 and includes a mounting member or plate 12 of disk-like configuration fastened to the mounting end of a typical trailer tongue 14 by way of a pair of mounting bolts 16 and a rigid bar 18. An elongated support structure, generally indicated by the numeral 20 includes an elongated rigid member 22 with a pair of spaced arms 24 and 26 extending outwardly and generally perpendicular to member 22. A caster wheel assembly 28 is connected to the lower end of a threaded shaft 30 which is threadedly received by apertures formed in arms 24 and 26. The upper end of shaft 30 is provided with a crank handle 32 to effect manual rotation of the shaft for the purposes of raising or lowering the end of the trailer tongue.

As mentioned above, it is often desirable to retract the support structure such that it will not interfere with movement of the trailer. FIG. 2 of the drawing illustrates the support structure in a retracted or generally horizontal position, such that it is disposed alongside of and generally parallel to the trailer tongue. It will be observed that mounting plate 12 is provided with a pair of rigid stop members 34 and 36 which are affixed to the mounting plate and spaced from each other to define a keyway or opening which receives the upper end of member 22 when moved to the horizontal position. The upper end of member 22 is held in the keyway defined by the stop members under the influence of a coil tension spring 38, or other biasing means, which extends between the mounting plate 12 and member 22. The manner in which it is moved between the vertical and horizontal positions and locked firmly in place at those positions is hereinafter explained.

Figure 5:
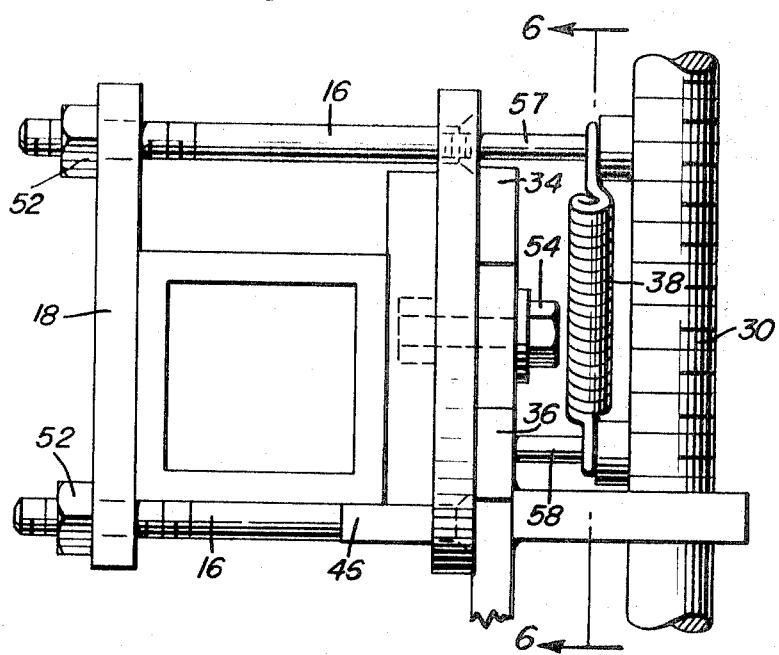
FIG. 5 is an enlarged partial front elevation of the stand shown in FIG. 4.

With reference to FIGS. 3–5, the manner in which the stand of the present invention is mounted to the associated trailer tongue may be seen in more detail. Preferably, mounting plate 12 is provided with a pair of spaced, parallel rigid members 40 and 42 which are adapted to abut against the side surfaces of trailer tongue 14. The lower ends of members 40 and 42 terminate at protrusions 44 and 46 which are rigid with mounting plate 12 and are adapted to underlie a portion of the trailer tongue, as best illustrated in FIG. 5. Members 40 and 42, together with protrusions 44 and 46 define a mounting seat of configuration similar to a portion of the trailer tongue. Of course, it will be appreciated that these members may be provided in various shapes and configurations in order to conform with the trailer tongue to which the stand of the present invention is to be mounted. A pair of mounting holes 48 and 50 are provided in plate 12 to accommodate bolts 16. Nut members 52, or other fastening means, are threaded to the opposite ends of bolts 16 and are tightened against fastening bar 18 to influence such firmly against the trailer tongue. Thus, when nut members 52 are firmly tightened, the stand is fastened securely in place with the trailer tongue held between bar 18 and mounting plate 12.

It will be observed that a bolt, or similar member 54 is rigidly fastened to mounting plate 12 by way of a central aperture 56. This defines a pivot pin about which member 22 is articulated during movement between the vertical and horizontal positions. A pair of spring support fingers or rods 57 and 58 are affixed to mounting plate 12 and member 22, respectively, with the opposite ends of coil tension spring 38 being appropriately fastened thereto.

Referring now, more particularly, to FIG. 6 of the drawings, it will be observed that the upper end portion of member 22 is provided with an elongated slot or opening 60, through which pivot pin 54 passes. The head of the pivot pin is of greater dimension than slot 60 and, as such, the upper end of member 22 is held against dislodgement from the pivot pin at all times. Slot 60, together with the pivot pin define a slot and pivot connection which permits the articulation of the support structure for expeditious movement thereof between the horizontal and vertical positions. It will be appreciated that biasing spring 38 is positioned such that it influences the peripheral side surfaces of member 22 into engagement with surfaces on stop members 34 and 36 as indicated at 62 and 64. Since stop members 34 and 36 are spaced from each other and on opposite sides of the pivotal axis, they are effective to prevent rotation of the support member. Also, it will be observed that the direction of spring pull is such that member 22 is influenced in an upward direction to the end of travel of slot 60 when in the vertical position.

In order to articulate movement of the support structure to the horizontal position, member 22 is moved in a downward direction as indicated by arrow 66 until it reaches the end of travel as defined by slot 60. Member 22 is then pivoted in a counterclockwise direction as indicated by arrows 68, beyond an intermediate position indicated in dash line at 70 to a horizontal position shown in dash line at 72. Member 22 is then moved horizontally in a direction indicated by arrow 74, such that the upper end portion of member 22 is received in the opening or keyway defined by stop members 34 and 36. In this position, the opposite peripheral side surfaces of member 22 will engage stop members 34 along the surfaces indicated at 76 and 78. Thus, movement of the support structure between the horizontal and vertical positions requires only three simple steps of pulling, pivoting, and pushing the support member 22. It will be appreciated that spring 38 is effective to influence the upper end of member 22 into the keyway once it has been pivoted to a horizontal orientation. It will also be appreciated that this operation may be achieved without the use of special tools, or the like.

From the foregoing description, it will be appreciated that the retractable trailer tongue stand of the present invention includes a minimum number of moving parts, and, as such, is relatively inexpensive to manufacture and maintain. The stand of the present invention may be easily fastened to existing trailer tongues and provides quick and convenient movement of the support structure between the horizontal and vertical positions. Preferably, the component pieces of the stand are made of rugged, non-corrosive materials such as stainless steel, aluminum, or other appropriate alloys. This assures that the support structure will not become frozen in place due to rust or corrosion when exposed to the elements over long periods of time.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

What is claimed as new is as follows:

1. A retractable stand for trailer tongues, said stand comprising a mounting plate adapted to be fastened to a trailer tongue, a pivot pin attached to said mounting plate and defining a pivotal axis, an elongated support member with longitudinal peripheral surfaces and a longitudinal slot near one end, said slot cooperating with said pivot pin, said support member being movable selectively between first and second angular positions about said pivot pin, and a pair of spaced stop members affixed to said mounting plate and spaced apart from each other to define a keyway of sufficient dimension to snugly receive said support member therebetween when in said first position, and said stop members each further snugly engaging the longitudinal peripheral surfaces of a common side of said support member when said support member is in said second position, thus preventing movement when in said first and second positions.

2. The stand set forth in claim 1 wherein said first and second angular positions are generally perpendicular to each other.

3. The stand set forth in claim 1 together with means biasing said peripheral surfaces of said support member toward said stop members.

4. The stand set forth in claim 3 wherein said biasing means includes a spring extending between said mounting member and said support member.

5. The stand set forth in claim 4 wherein said spring is comprised of a coil tension spring.

6. A stand for trailer tongues and the like, said stand comprising a stationary mounting member adapted to be attached to a generally horizontally arranged trailer tongue, an elongated, movable support structure adjustably connected to said mounting member and movable between a generally vertical position and a generally horizontal position, means adjustably fastening said support structure to said mounting member for selective movement between said vertical position and said horizontal position, said fastening means including an elongated slot at the upper end of said support member and running longitudinally of said support member and receiving a pivot pin connecting said stationary mounting member and said movable support structure, said fastening means further including a pair of rigid stop members lying on different radii about said pivot pin and on opposite sides of the pin, said stop members being spaced apart a distance to snugly receive and engage the upper end portion of said support structure, cooperating with said slot and pivot pin to maintain said support structure in either said vertical position or said horizontal position.

7. The stand set forth in claim 6 wherein said fastening means includes biasing means for influencing said support structure toward said stop members.

* * * * *